Sept. 15, 1970         C. A. WALLACE         3,528,197
PNEUMATIC OSCILLATING ROTATING GRINDING WHEEL HUB
Filed Sept. 27, 1968                    5 Sheets-Sheet 1

INVENTOR.
CLYDE A. WALLACE,
BY
Berman, Davidson & Berman
ATTORNEYS

Sept. 15, 1970  C. A. WALLACE  3,528,197
PNEUMATIC OSCILLATING ROTATING GRINDING WHEEL HUB
Filed Sept. 27, 1968  5 Sheets-Sheet 2

INVENTOR.
CLYDE A. WALLACE,
BY
Berman, Davidson & Berman
ATTORNEYS.

Sept. 15, 1970 C. A. WALLACE 3,528,197
PNEUMATIC OSCILLATING ROTATING GRINDING WHEEL HUB
Filed Sept. 27, 1968 5 Sheets-Sheet 1
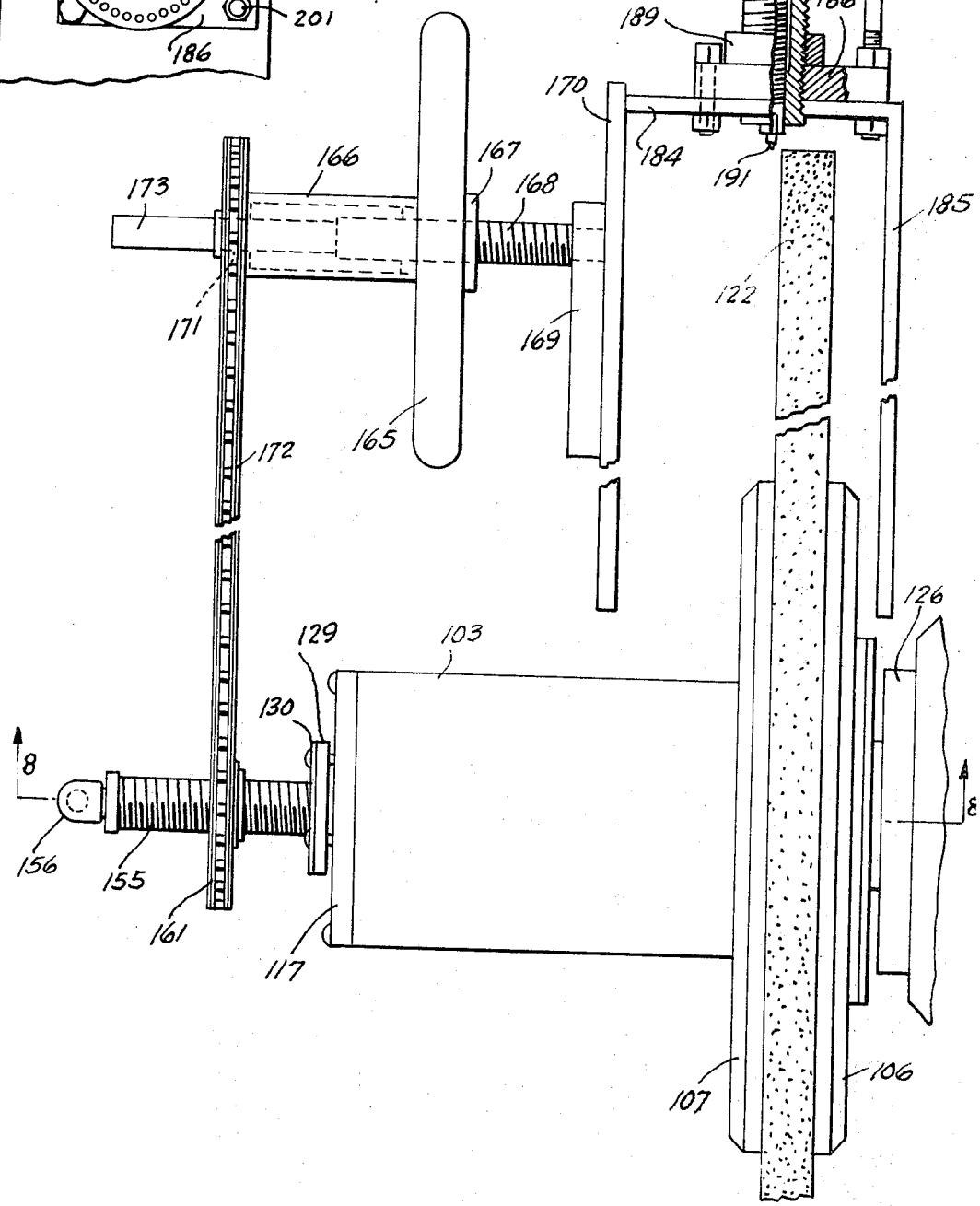
INVENTOR.
CLYDE A. WALLACE,
BY
Berman, Davidson & Berman
ATTORNEYS.

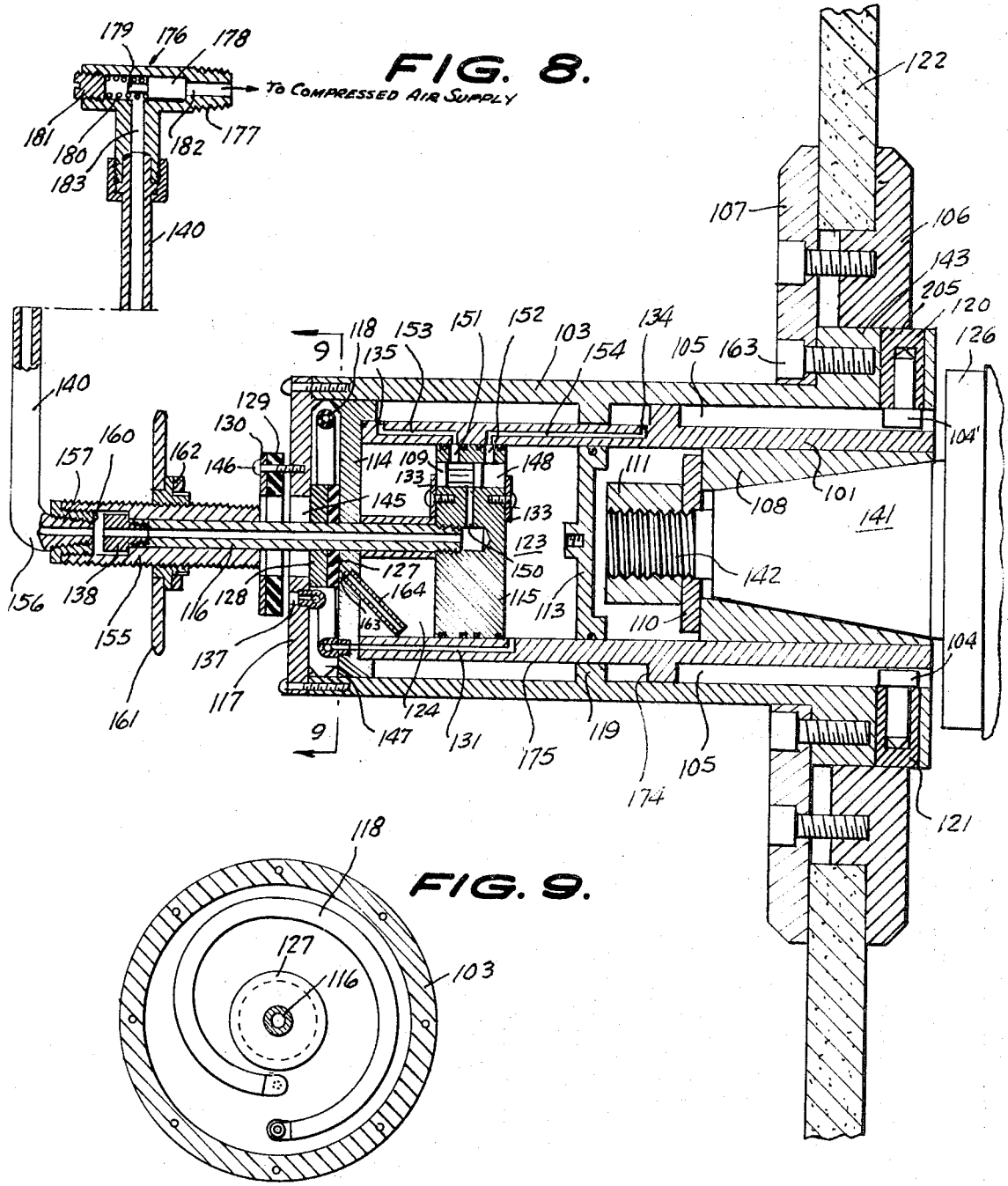

United States Patent Office 3,528,197
Patented Sept. 15, 1970

1

3,528,197
PNEUMATIC OSCILLATING ROTATING
GRINDING WHEEL HUB
Clyde A. Wallace, 1816 Greenvale Road,
Albany, Ga. 31705
Continuation-in-part of application Ser. No. 620,464,
Mar. 3, 1967. This application Sept. 27, 1968, Ser.
No. 763,337
Int. Cl. B24b 5/00, 7/00
U.S. Cl. 51—34       26 Claims

ABSTRACT OF THE DISCLOSURE

A grinding wheel having a power-driven hollow spindle provided with an external annular piston element, with a cylindrical housing slidably-mounted on the spindle and slidably and sealingly-receiving the piston element. A grinding wheel is secured on the cylindrical housing. The cylindrical housing is keyed to the spindle. A fixed stop member is provided on the spindle at one side of the housing and an adjustable stop member is provided at the other side of the housing to limit the reciprocating stroke of the grinding wheel. Compressed air is supplied through an axially-extending tube and is delivered through a reversing valve arrangement alternately on opposite sides of the piston element to the housing while it is being rotated by the spindle. One form of the invention includes an adjustable grinding wheel dressing fixture arranged to dress the grinding wheel automatically during operation thereof. The fixture includes an arrangement for providing fine adjustments of the position of its dressing tool.

The present application is a continuation-in-part of my prior application Ser. No. 620,464, filed Mar. 3, 1967, and entitled "Pnuematic Oscillating Rotating Grinding Wheel Hub."

This invention relates to grinding machines, and more particularly to a grinding wheel reciprocating mechanism.

A main object of the invention is to provide a novel and improved means for reciprocating a grinding wheel on its driving spindle relative to a workpiece being ground so as to produce a honing action, the mechanism being simple in construction, being automatic in operation, and having means for adjusting its working stroke.

A further object of the invention is to provide an improved reciprocating attachment for a grinding wheel assembly adapted to be employed on a wide range of grinding machines, for example, on crackshaft grinding machines, or the like, the attachment involving inexpensive components, being durable in construction, being smooth in operation, and involving a minimum number of parts.

A still further object of the invention is to provide an improved grinding wheel hub assembly provided with means for reciprocating the associated grinding wheel during its operation, providing continuous and smooth reciprocation of the grinding wheel, whereby a relatively narrow wheel may be employed to machine a surface of substantial width, the apparatus providing smooth and uniform reciprocation at a steady rate and including means for adjusting the stroke of reciprocation, as desired, the apparatus thereby enabling a wide range of journals or other surfaces to be machined with the use of only a few widths of grinding wheels and making it possible to employ relatively narrow grinding wheel widths.

A still further object of the invention is to provide an improved grinding wheel reciprocating mechanism for use on various types of grinding machines, for example, on crankshaft grinding machines, or the like, the mechanism making it possible for relatively unskilled operators to perform careful and accurate work, even with the use of relatively narrow grinding wheels.

A still further object of the invention is to provide an improved pneumatically-operated grinding wheel reciprocating mechanism which employs compressed air as its driving medium and which is provided with improved reversing valve structure for feeding compressed air alternately on opposite sides of its piston element so as to produce the desired reciprocating action, the mechanism also being arranged to provide a dwell, or delay at respective ends of its stroke to ensure that corners on the workpiece will be properly ground, the apparatus providing a substantial saving in grinding time and minimizing wear on the associated grindstone.

A still further object of the invention is to provide an improved grinding wheel hub assembly provided with means for reciprocating its associated grinding wheel during its operation, the mechanism providing a substantial saving in time by eliminating the necessity for frequently changing the size of the associated grinding wheel, the operation of the mechansim being such that undesired taper effects on the workpiece are eliminated, the machine providing maximum visibility of the workpiece being machined, the apparatus being readily adjustable, even while in operation, and the device being operable by a relatively unskilled person.

A still further object of the invention is to provide an improved grinding wheel hub assembly of the type having means for reciprocating the associated grinding wheel during its operation, the assembly minimizing the necessity for frequent balancing of its parts, providing efficient stress and heat distribution on the workpiece being ground, the machine being provided with an adjustable dressing attachment enabling the associated grindstone to be automatically dressed during the operation of the machine, and the attachment being provided with means for enabling the dressing tool thereof to be adjusted both in coarse and fine steps, as required.

A still further object of the invention is to provide an improved grinding wheel reciprocating mechanism wherein a superior honing action is provided and wherein the finish on the workpiece being ground is improved, as over previously-employed grinding wheel assemblies.

Further objects and advantages of the invention will become apparent from the following description and claims, and from the accompanying drawing, wherein:

FIG. 6 is a fragmentary side elevational view, partly in vertical cross-section, of a modified form of crankshaft grinding machine constructed in accordance with the present invention.

FIG. 7 is a fragmentary horizontal cross-sectional view taken substantially on the line 7—7 of FIG. 6.

FIG. 8 is a fragmentary horizontal cross-sectional view taken substantially on the line 8—8 of FIG. 6.

FIG. 9 is a transverse vertical cross-sectional view taken substantially on the line 9—9 of FIG. 8.

Figure 1:
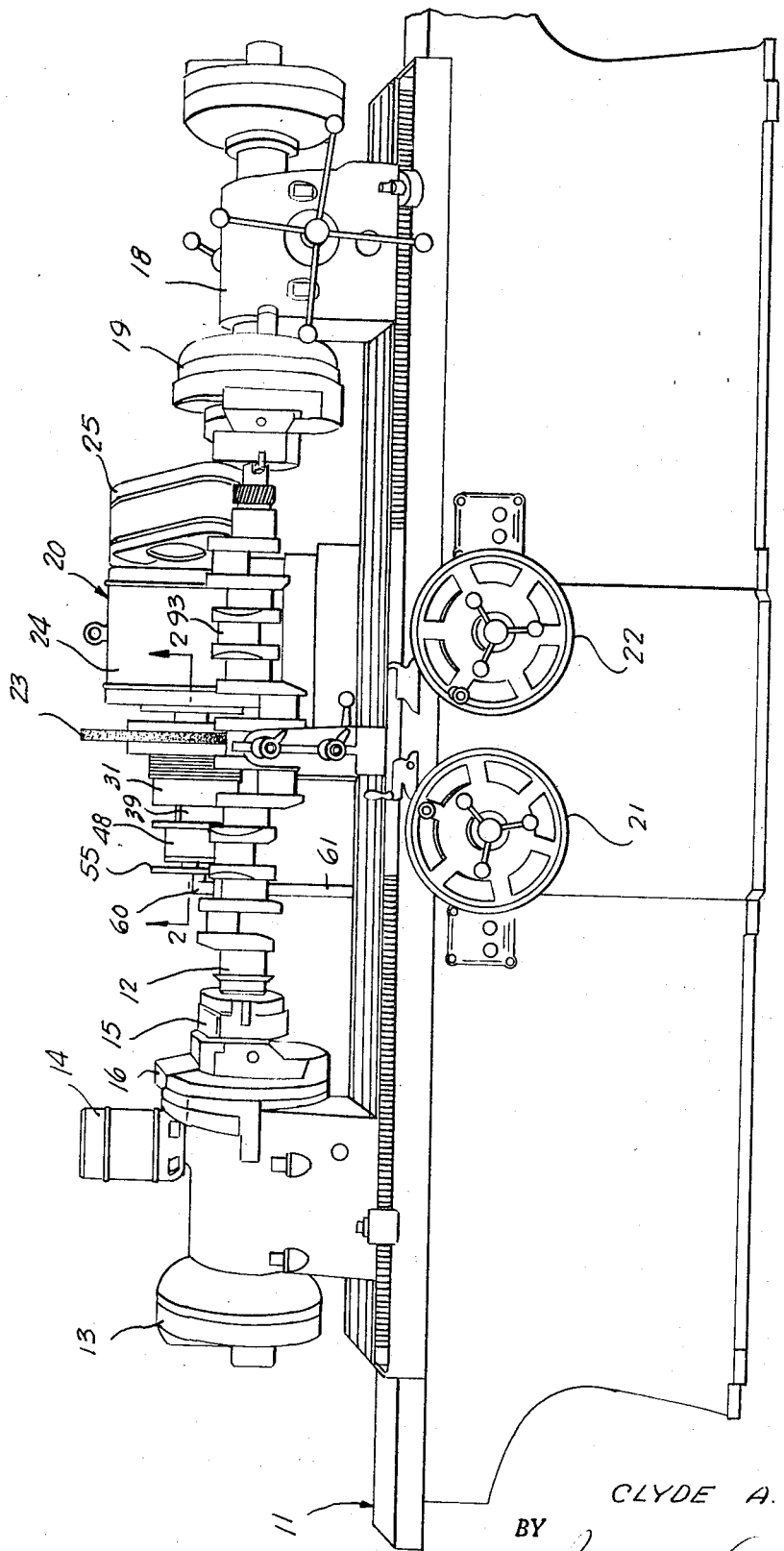
FIG. 1 is a front elevational view of a crankshaft grinding machine provided with an improved grinding wheel reciprocating mechanism constructed in accordance with the present invention, shown set up for use on a crankshaft mounted in the machine.

Referring to the drawings, 11 generally designates a grinding machine which may be of a specific type for machining a special object, such as a crankshaft 12, as illustrated. Thus, the machine 11 may be provided with a work head spindle assembly 13 driven by a motor 14 and may be provided with a back plate assembly 15 including throw-adjustment means designated generally at 16. The machine likewise includes a tailstock assembly having a face plate assembly 19 provided with suitable throw-adjusting means similar to that provided for the headstock or work head for adjusting the throw of the element 15. A traveling grinding wheel assembly, designated generally at 20, is provided, the longitudinal and transverse positions of the assembly 20 being controlled by respective handwheels 21 and 22, the adjustments of the assembly 20 being performed in a conventional manner so as to position a grinding wheel 23 driven by the assembly 20 for machining a desired portion of the crankshaft 12. The grinding wheel 23 is driven by a motor 24 carried by the assembly 20, the motor 24 being drivingly-coupled by suitable belt-transmission means contained in a housing 25 to a rotatable spindle 26 which, in turn, is coupled to the grinding wheel 23. The structure thus far described is conventional and is similar to the structure of various commercial grinding machines, for example, the "Model 518-B Crankshaft Grinder," manufactured by Lemco Equipment Division, 5490 Dunham Road, Bedford, Ohio, or the "AMC Model K-1500 Crankshaft Grinder," distributed by J. S. Branham, Jr., Associates, Oxford, Ga.

Figure 2:
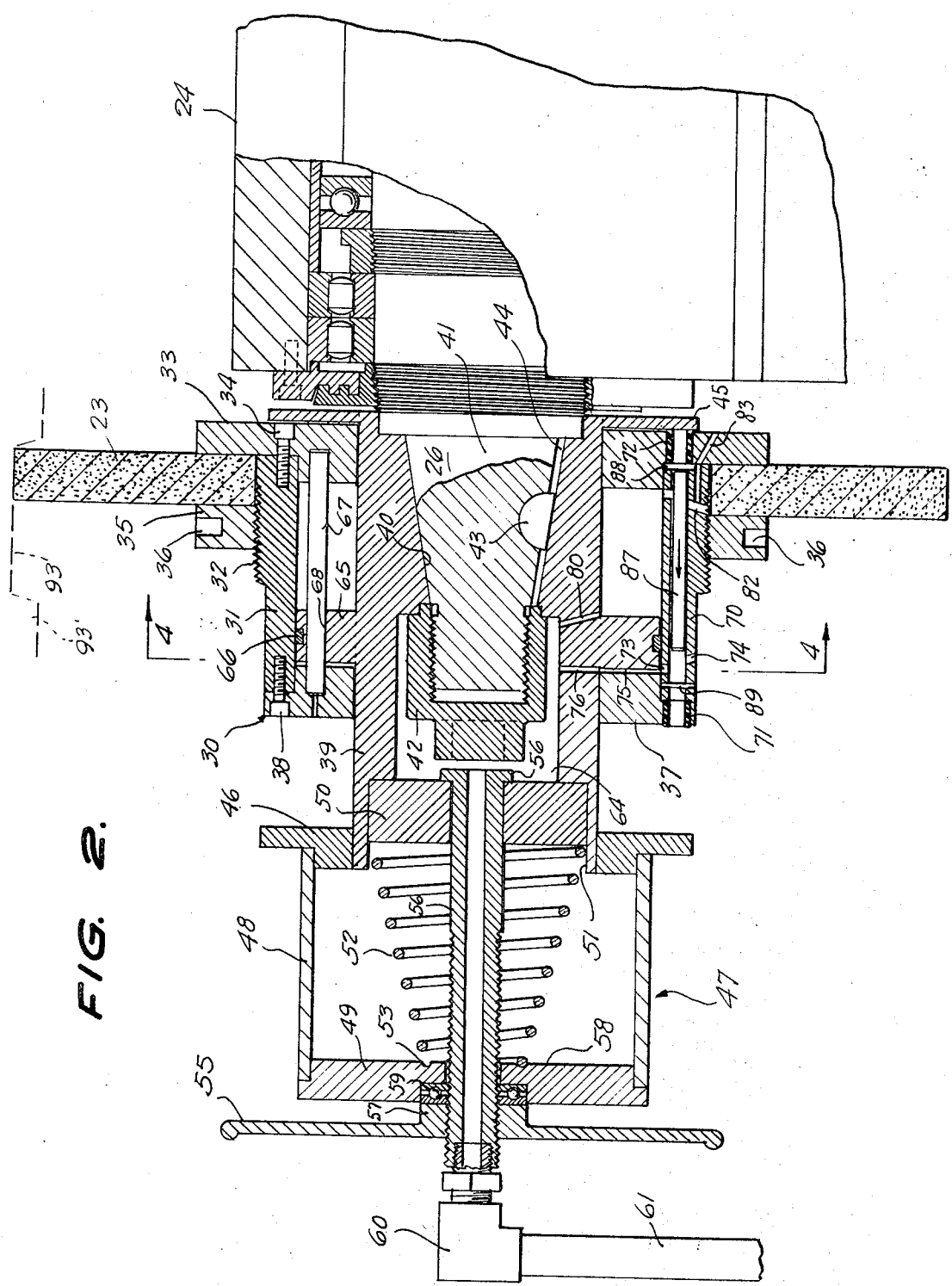
FIG. 2 is an enlarged fragmentary horizontal cross-sectional view taken through the grinding wheel reciprocating mechanism substantially on the line 2—2 of FIG. 1.
Figure 3:
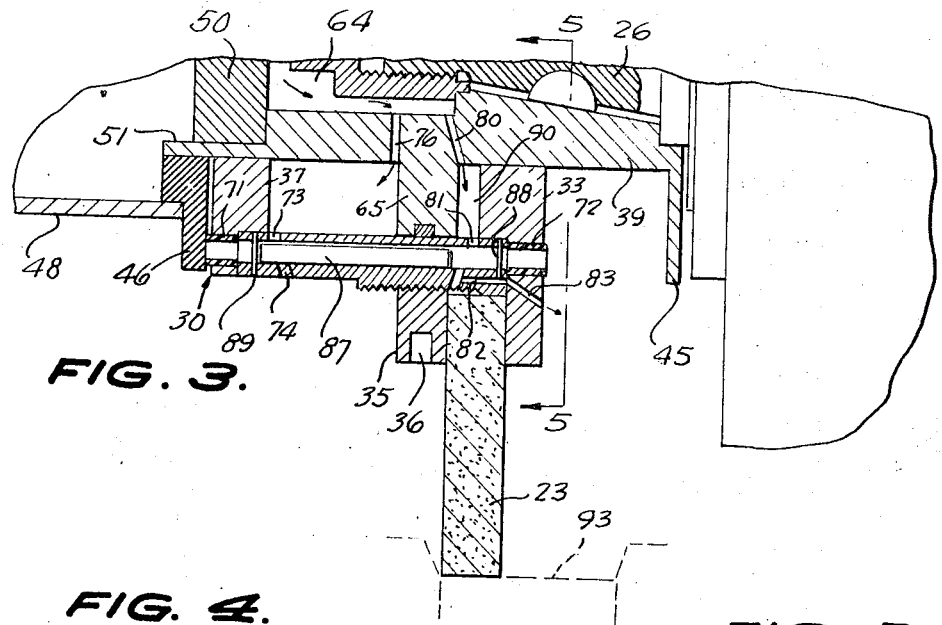
FIG. 3 is a fragmentary horizontal cross-sectional view showing a portion of the structure of FIG. 2, but with the grinding wheel moved to the opposite end of its operating path of reciprocation.
Figures 4, 5:
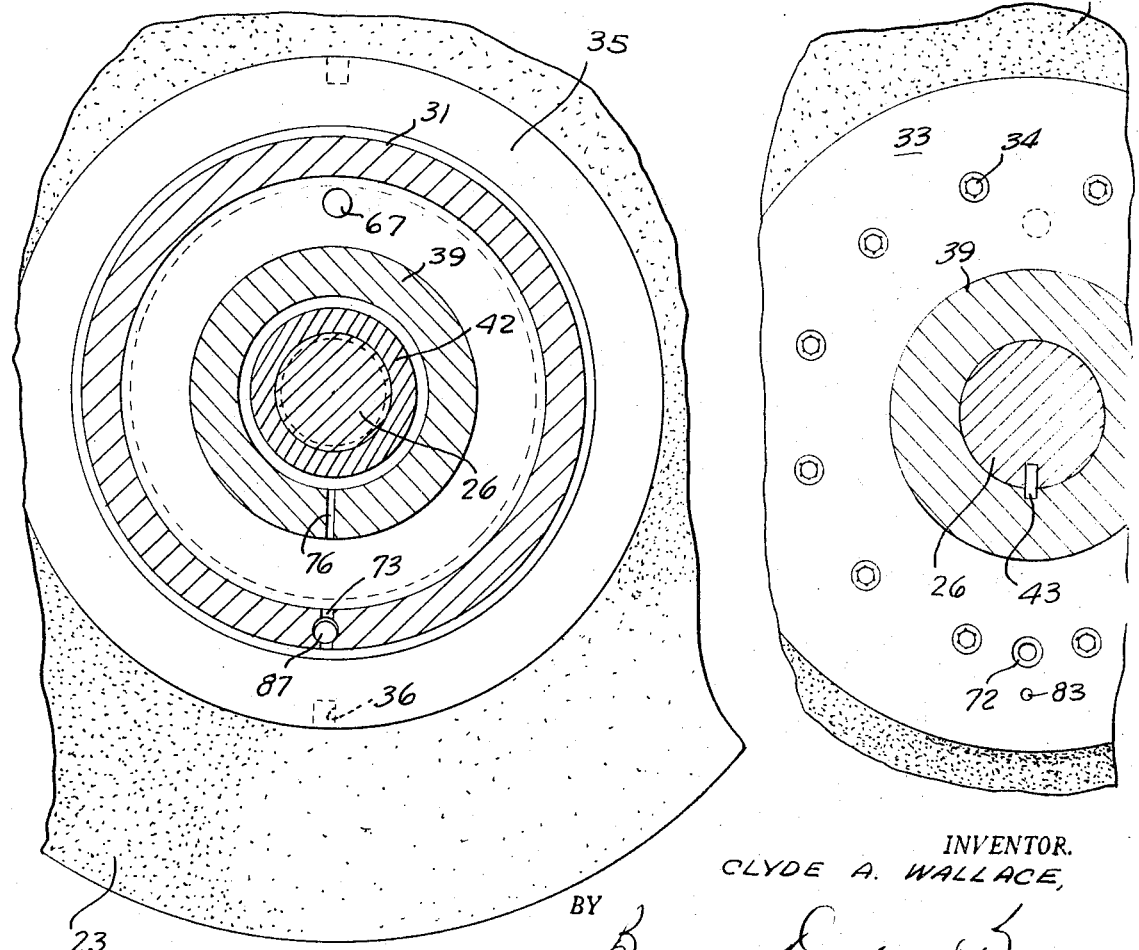
FIG. 4 is a fragmentary transverse vertical cross-sectional view taken substantially on the line 4—4 of FIG. 2.
FIG. 5 is a fragmentary transverse vertical cross-sectional view taken substantially on the line 5—5 of FIG. 3.

In accordance with the present invention, means are provided for automatically reciprocating the grinding wheel 23 as it is being rotatably driven by the spindle 26. Referring to FIGS. 2–5, it will be seen that the annular grinding wheel 23 is clamped on a generally annular housing, designated at 30, the housing comprising a cylindrical body 31 having an externally threaded portion 32. The body 31 is secured to a transversely extending annular end plate 33 by bolts 34, and the annular grinding wheel 23 is engaged on the end portion of body 31 in contact with plate 33 and is clampingly secured thereagainst by an annular locking ring or nut 35 threadedly engaged on the externally threaded portion 32 of the body 31, as shown in FIG. 2. The ring 35 is provided with diametrically opposed recesses 36, 36 for engagement by a suitable tightening tool. Thus, in the construction shown in FIG. 2, the end plate 33 is located at the right end of the cylindrical body 31. An annular cover plate 37 is secured to the left end of body 31 by bolts 38.

The annular end plates 33 and 37 are slidably supported on a generally cylindrical spindle sleeve 39 which is rigidly secured on the spindle 26. Thus, the sleeve 39 is formed with frusto-conical bore portion 40 which receives the correspondingly tapered intermediate portion 41 of the spindle 26 and which is clamped thereto by a capped nut 42 threadedly engaged on the end of the spindle 26, as is clearly shown in FIG. 2. The sleeve 39 and spindle 26 are locked against rotation relative to each other by the provision of a locking key 43 provided in a recess in spindle portion 41 and engaging in a locking groove 44 formed in the frusto-conical bore portion 40 of spindle sleeve 39.

The right end of body 39 is integrally formed with a stop flange 45. Slidably mounted on the left end of the spindle sleeve 39 in an annular flange element 46 which forms the end wall of a spring housing, designated generally at 47, and comprising a cylindrical body 48 rigidly secured at its right end to the member 46 and provided at its left end with an end wall 49. A circular end plate 50 is rigidly secured in a counterbore 51 formed in the left end portion of spindle sleeve 39, as shown in FIG. 2. A generally frusto-conical helically coiled spring 52 is provided in the housing 47, the larger end thereof bearing on the plate 50 and the smaller end thereof bearing in an annular groove 53 formed in the left end wall 49. A manually operated adjusting nut 55 is threadedly engaged on a fixed tubular axial conduit 56 which extends axially through housing 47 and through end plate 50, being rotatably mounted at its right end, as viewed in FIG. 2, in end plate 50 and provided with a retaining flange 56'.

The adjusting nut 55 comprises a flange or wheel having a hub portion 57 which transmits bearing force to the end wall 49 through a ball bearing assembly 58 interposed between hub 57 and end wall 49, the ball bearing assembly being received in an annular recess 59 provided in the end wall 49, as shown in FIG. 2. Coil spring 52 biases stop plate 46 leftwards, as viewed in FIG. 2, and the position of the stop plate can be adjusted on spindle sleeve 39 by rotating the nut member 55. Since nut member 55 is threaded on the tubular axial conduit 56, rotation of nut member 55 in one direction moves stop plate 56 to the right, and rotation of nut member 55 in the opposite direction causes the stop plate 46 to be moved to the left by the action of the spring 52.

Connected to the outer end of the tubular member 56 by a conventional elbow connector 60 is a conduit 61 leading to a source of compressed air. Thus, it will be seen from FIG. 2 that the tubular conduit 56 connects supply conduit 61 to the interior space 64 of spindle sleeve 39.

Rigidly secured on the intermediate portion of the spindle sleeve 39 is an annular piston flange 65 whose periphery is sealingly and slidably engaged with the inside surface of the cylindrical body 31. A resiliently deformable sealing ring 66 is seated in a groove formed in the outer periphery of the piston flange 65 to provide sliding and sealing contact with said inside surface of member 31. A longitudinally extending retaining pin 67 is secured at its opposite ends, respectively, in the end wall members 33 and 37 and extends slidably through a bore 68 provided in the piston flange 65. Flange 65 is freely slidable relative to pin 67, but there is a relatively small clearance between pin 67 and bore 68 so as to restrict air leakage therebetween.

Mounted in the wall of member 31 diametrically opposite the location of pin 67 is the tubular housing 70 whose opposite ends communicate with respective resiliently deformable sleeve elements 71 and 72 secured in apertures provided in end wall members 37 and 33. The sleeves 71 and 72 project slightly outwardly and are sealingly engageable at times respectively with annular stop plate 46 and annular stop flange 45 in a manner presently to be described. Tubular member 70 is formed at its left end portion with an inwardly positioned aperture 73 and with a diametrically opposite outwardly positioned aperture 74, as shown in FIG. 2. Spindle sleeve 39 is formed with a small passage 76 located to communicate with the clearance space 75 defined between wall member 37 and piston member 65 when the housing 30 is at the right end of its travel, as viewed in FIG. 2, namely, when member 33 abuts stop flange 45. Tubular member 70 is formed with the inwardly directed port 73 located opposite passage 76, and thus is adapted to communicate with the aforesaid clearance space 75. Tubular member 70 is further formed opposite port 73 with a vent port 74 exposed to atmosphere. Thus, with the arrangement of the parts shown in FIG. 2, namely, with member 33 abutting stop flange 45, the space 64 is vented to atmosphere through the small passage 76, clearance space 75, port 73, port 74, and the open end of sleeve member 71.

Spindle sleeve 39 is further formed with another small passage 80 opening into the interior of housing 30 in a location spaced rightwards from passage 76, as viewed in FIG. 2, by slightly more than the thickness of piston flange 65. The right end portion of tubular member 70 is formed with an inwardly facing port 81 and with an opposite port 82 communicating with a vent passage 83 exposed to atmosphere. In the position of the parts shown in FIG. 2, the right end of sleeve member 72 is sealed by contact with stop flange 45, but the vent passages 82, 83 are likewise blanked off by the provision of a longitudinally slidable valve pin 87 which blanks port 82. A transverse stop pin 88 is provided in the right end of tubular member 70 to limit the rightward movement of valve pin 87, and a similar transverse stop pin 89 is provided in the left end portion of tubular member 70 to limit the leftward movement of valve pin 87. As shown, the pin 89 is located leftwards of the passage 75.

The valve pin 87 fits in the bore of sleeve member 71 relatively loosely, so that when the parts are in the position thereof shown in FIG. 2, with the pin 87 in engagement with the rightwards stop pin 88, the vent port 82 is substantially blanked off, since centrifugal force acts on the valve pin 87 and presses it outwardly and there is a certain amount of clearance between pin 87 and the aperture 81. Since the sleeve element 72 is in sealing engagement with flange 45, this allows air pressure to build up in the sleeve member 72 to a value sufficient to move valve pin 87 leftwards into engagement with stop pin 89. Thus, starting from the position of the parts shown in FIG. 2, the compressed air flows from space 64 through passage 80 into the interior of housing 30 to the right of piston 65, and then through passage 81 and past the valve pin 87 into the space inside of sleeve member 72. When the pressure builds up, as abovementioned, in the space inside sleeve member 72, the pin 87 is moved leftwards into engagement with the opposite stop pin 89. When this occurs, the port 73 is blanked off sufficiently to allow a build up of air pressure in the clearance space 75 which causes housing 30 to move to the left from the position of FIG. 2 towards the position shown in FIG. 3, inasmuch as the space in housing 30 to the right of piston 65 has become vented to atmosphere through passage 81, the interior of tubular member 70, passage 82, and vent passage 83. This occurs because the valve pin 87 has been moved to the left, as above described, exposing port 82. When the parts move to the positions thereof shown in FIG. 3, the space in housing 30 to the right of piston flange 35 is vented to atmosphere, since sleeve member 72 is now unsealed, and passage 82 is open. However, vent passage 74 is sealed and sleeve member 71 is in sealing engagement with stop flange 46. Compressed air from space 64 thus enters the space in housing 30 to the left of piston 65 and flows through port 73 and past the left end of valve pin 87 into the interior of sleeve member 71. Since the opposite sleeve member 72 is completely vented to atmosphere, there is enough pressure differential to allow a build up of pressure inside the sealed sleeve member 71 sufficient to move valve pin 87 rightwards toward engagement with the right end stop pin 88. The reversal of position of stop pin 87 thus blanks port 81 sufficiently to cause a build up of pressure in the space 90 between piston member 65 and wall 33, which, combines with the venting of the space to the left of piston 65, causes the housing 30 to be moved rightward, as viewed in FIG. 3, and to be returned to the starting position thereof as shown in FIG. 2. With the parts thus returned to the position shown in FIG. 2, the above described cycle is repeated successively, whereby housing 30, along with the grinding wheel 23 is reciprocated back and forth between the stop members 45 and 46.

The degree of movement longitudinally of the grinding wheel 23 can be regulated by adjustment of the nut member 55, which can be adjusted while the machine is in operation as well as at other times, as nut 55 does not turn except by hand. This establishes the distance between members 45 and 46. The adjustment of the reciprocation stroke may thus be in accordance with the longitudinal distance on a crank journal 93, or similar objects being machined.

The adjusting nut 55 can be extended until the lefthand edge of the grinding wheel 23 engages the lefthand crank shaft flange 93', shown in FIG. 2, without stopping the grinding operation to make this adjustment. The rigid elbow 60 keeps the tubular axial conduit 56 from rotating and allows all the other parts to revolve around it except adjusting nut 55 and hub 57.

It will be noted from the above description that the provision of the housing 30 carrying the grinding wheel 23 provides a pneumatic cylinder means which cooperates with the piston element 65 fixedly secured on the spindle sleeve 39 through the above described action of the reciprocating valve piston element 87 to provide the desired smooth repeated reciprocation of the grinding wheel 23 longitudinally on the spindle sleeve 39. The spindle sleeve 39 rotates along with the housing 30 since the longitudinal rod-like element 67 cooperates with the bore 68 and piston 65 to prevent relative rotational displacement of housing 30 with respect to sleeve 39. Grinding wheel 23 is thus rotationally driven by spindle 41 as it reciprocates longitudinally. As above mentioned, the amplitude of the reciprocatory movements can be adjusted by adjusting the position of the stop member 46 on spindle sleeve 39 by means of hand wheel or nut member 55 threadedly engaged on tube 56.

Because of the reciprocatory movement of the grinding wheel 23, relatively narrow grinding wheels may be employed. Since the cost of grinding wheels depends on their thickness, it will be apparent that by using the apparatus above described the expense involved in providing grinding wheels can be minimized. It is obviously unnecessary to furnish grinding wheels of different thicknesses, since, by adjusting the nut or wheel member 55, the excursion of the grinding wheel 23 may be set to correspond to the longitudinal length of the surface to be ground, for example, the crankshaft journal surface 93 shown in FIGS. 2 and 3. Since the stroke of reciprocation of the grinding wheel can be preset, relatively unskilled operators may use the device, since it is not necessary for the operator to control the longitudinal excursion of the grinding wheel after the correct setting has been made by means of the nut or wheel member 55.

It will also be apparent that the wear on the grinding wheel is relatively even since its reciprocatory movement is at a steady rate, so that there is no tendency for the periphery of the grinding wheel to become beveled because of wear, and thus, it is unnecessary for the grinding wheels to be frequently dressed to remove such bevels.

It will be further apparent that because of the combined longitudinal reciprocation and rotational movement of the grinding wheel 23, the patterns described on the surfaces being ground are diagonal or helical rather than linear, providing eventual better lubrication because the distribution of oil is facilitated by the diagonal or helical honed patterns.

Another advantageous feature is that if the periphery of the grinding wheel contains irregularities in contour, such irregularities will not be transferred to the surface being machined since the grinding wheel reciprocates continuously as it rotates and does not remain in a stationary position. For the same reason, there is no concentration of stress or heating effects on the surface being machined since the grinding wheel moves continuously along the machined surface and the grinding contact takes place in a uniform and even manner.

Referring now to the form of the invention illustrated in FIGS. 6 to 9, the spindle, shown at 126 is formed with the frusto-conical portion 141 which is axially received in and clampingly secured in the sleeve-like spindle extension 101 by means of a clamping nut 111 threadedly engaged on the reduced externally threaded extension stud 142 of member 141 and which bears on a clamping washer 110, which in turn bears on an annular wedging member 108 which has an internal frusto-conical surface conformingly receiving the frusto-conical member 141. The tightening of the nut 111 on the stud 142 exerts inward wedging force on the member 108 and thereby frictionally locks the sleeve-like extension 101 to the member 141.

The generally cylindrical external body 103 carrying the grinding wheel 122 is slidably mounted on the sleeve-like extension 101 and is keyed against rotation relative thereto, but is slidable longitudinally thereon. The annular grind stone 122 is clamped between the lefthand hub flange 107 and the righthand flange 106, the lefthand hub flange 107 being secured to a flange 143 of body 103 by fastening bolts 163.

The external body 103 is keyed for longitudinal movement on the spindle extension 101 by the provision of diametrically opposed longitudinal key ways or grooves 105, 105 in the member 101 which slidably receive respective diametrically opposed guide rollers 104 and 104' carried by the flange member 143. The guide roller 104 has a shank which is mounted in a guide bushing 121 secured in flange member 143, the shaft of the roller 104 being rotatably received in the bushing 121 and being axially disposed therein. The opposite guide roller 104' has a shaft which is rotatably received in an eccentric guide bushing 120 which is adjustable around its axis, whereby to allow adjustment of the position of the shaft of roller 104' in order to compensate for inaccuracy in machining the grooves 105, 105. Thus, the bushing 120 may be adjusted to allow for accurate longitudinal movement of the body 103 on the spindle extension 101 smoothly and without binding.

The sleeve-like main body 103 is provided at its left end, as viewed in FIG. 8, with a centrally apertured end plate or cover 117, the central aperture thereof being shown at 145. Slidably mounted concentrically with the aperture 145 are a resilient deformable washer 129 of neoprene, or similar resilient deformable material and a rigid washer 130, said washers 129 and 130 being slidably supported on a plurality of bolts 146 threadedly engaged in the end plate 117 and spaced around the axis of aperture 145 concentrically therewith. The spindle extension 101 is provided with an end plate 114 rigidly secured to its left end, as viewed in FIG. 8 and being spaced from end plate 117, defining a clearance space therebetween shown at 147 in FIG. 8. The position of the parts of FIG. 8 shows the space 147 in its minimum condition, namely, with the body 103 substantially at the end of its rightward excursion, as viewed in FIG. 8.

A circular end plate 113 is sealingly secured inside the spindle extension 101, adjacent the nut 111 as shown in FIG. 8. Sealingly secured inside the spindle extension and spaced substantially midway between end plates 113 and 114 is a relatively thick partition wall 115 formed with a bore 148 in which is slidably disposed a spool valve element 109 limited in its endwise movement by respective stop washers 133, 133 secured to the opposite sides of wall 115 and overlapping the opposite ends of bore 148. The spool valve 109 is movable between opposite positions communicatively connecting a passage 150 in wall 115 to respective ports 151 and 152 in the outer portion of wall 115, said ports being respectively in registration with the ends of respective passages 153 and 154 in the wall of the spindle extension 101.

Passage 150 communicates with an axial tubular conduit 116 threadedly secured centrally to wall 115 and extending leftward therefrom through aperture 145 and extending sealingly through the central aperture in end wall 114. Rotatably secured on the outer end of conduit 116 is an externally threaded bushing member 155, said bushing member being rigidly connected to the end of a stationary air supply conduit 140.

As shown in FIG. 8, the conduit 140 has a right angled end elbow portion 156 which is connected to the left end of bushing member 155 by means of a conventional flanged reducer fitting 157. The enlarged head portion of a thrust bushing 138 is engaged in the enlarged counter bore 160 at the left end of bushing member 155 and is threaded into the end of conduit 116, with its enlarged head portion bearing on the shoulder defined between counter bore 160 and the main bore of bushing member 155. A sprocket wheel 161 is threadedly engaged on the bushing member 155, said sprocket wheel being provided with a thrust washer 162 which is at times engageable by the inner peripheral portion of washer 130 as body 103 moves leftwards, as viewed in FIG. 8, whereby to cause resilient deformable washer 129 to move into sealing engagement with end wall 117, as will be presently described.

A resilient deformable sealing washer 127 is mounted on the conduit 116, and a rigid abutment washer 128 is slidably mounted on conduit 116 outwardly adjacent the washer 127, the washer 128 being sufficiently thick so as to exert sealing force on the resilient deformable washer 127 in the position of FIG. 8, namely, under the thrust applied thereto by end wall 117 as the body 103 reaches its rightward limiting position shown in FIG. 8.

End wall 117 is provided with a vent port 137 which is normally exposed to atmosphere but which is sealed when engaged by resilient deformable washer 129 responsive to the movement of body member 103 to its leftward limiting position, as will be presently explained. Port 137 is connected to a passage 131 and the wall of spindle extension 101 leading to the space 123 at the right side of wall 115, as viewed in FIG. 8. The connection is made by a substantially spirally-shaped resilient deformable conduit 118 having one end connected to a fitting connected to port 137 and the other end thereof connected to a fitting mounted in end wall 114 and communicating with the passage 131, the conduit 118 making a substantially complete turn around the tubular member 116, as shown in FIG. 9. The conduit 118 is sufficiently flexible to permit the reciprocating excursion of the body 103 on the spindle extension 101, as will be presently described.

End wall 114 is formed with an exhaust and oil scavenger port 163 terminating at its outer end in the sealing area of washer 127 and connected at its inner end to a downwardly and inwardly extending scavenger tube 164 extending into the space 124 at the left side of wall 115, as viewed in FIG. 8, and terminating adjacent the inside wall surface of spindle extension 101.

As will be presently explained, the limit of leftward excursion of body 103 is determined by the setting of the sprocket wheel 161 on the externally threaded bushing 155. The setting of sprocket wheel 161 is accomplished by means of a hand wheel 165 rigidly secured on a tubular supporting shaft 166 and provided adjacent the hand wheel 165 with a nut portion 167 which is threadedly-engaged on an externally threaded stud shaft 168 rigidly secured to a bracket member 169 fixed to the housing and frame of the grinding machine, designated at 170. The shaft 166 and its supporting stud 168 extend on an axis parallel to spindle 141. Secured on the left end of tubular shaft 166 is a sprocket wheel 171 which is drivingly coupled to the sprocket wheel 161 by a sprocket chain 172. The shaft 168 has a reduced unthreaded outer end portion 173 which rotatably supports the hub of the sprocket wheel 171 and thus provides a bearing support for the left end of the tubular shaft 166.

Designated at 119 is an annular piston element which is integrally formed on the external body 103, projecting internally thereof and being slidably and substantially sealingly engaged with the spindle extension member 101 at the peripheral surface thereof located forwardly of an annular shoulder 174 on member 101. Said peripheral surface, shown at 175, extends between the annular shoulder 174 and the lefthand end plate 114. Thus, the passage 154 has a port 134 opening into the space between piston element 119 and shoulder 174, and the passage 153 has a similar port 135 opening into the space between end plate 114 and piston element 119, the port 134 being located adjacent the shoulder 174 and the port 135 being located adjacent the rim of the end plate 114, as shown in FIG. 8. As previously mentioned, the respective passages 153 and 154 have inner ports registering respectively with the passages 151 and 152, whereby they are in communication with the valve bore 148 containing the spool valve 109. As will be apparent from FIG. 8, in the lefthand extreme position of the spool valve 109 passage 150 is connected to the left end of the space between end plate 114 and piston element 119, and in the righthand extreme position of the spool valve 109 passage 150 is in communication with the space between piston element 119 and shoulder 174. Spool valve 109 is slidably disposed in the bore 148 with a definite amount of looseness therein so that there is a controlled amount of clearance between the spool valve and the surface of bore 148 to permit some leakage for a purpose presently to be described.

Compressed air is supplied to the conduit 140 through an air flow regulator designated generally at 176. A suitable source of compressed air is connected to the externally threaded intake end 177 of the geenrally T-shaped air regulator 176, the stem portion of member 176 being connected to the conduit 140 in a conventional manner, as shown in FIG. 8. The main body portion of the regulator 176 is provided with a loosely fitting piston element 178 having a stem 179 received in one end of a coil spring 180 bearing between piston 178 and an end plug 181 provided in the body portion of the T-shaped valve 176 opposite the intake end 177 thereof. The spring 180 biases the piston 178 against the shoulder defined between the main cavity of the valve body and the reduced bore 182 of the intake end portion 177, as shown in FIG. 8. The compressed air from the supply source acts against the piston 178 and passes around the surface of the piston into the conduit 140 at a metered rate sufficient to supply the oscillating hub mechanism, as will be presently described. The piston 178 is biased towards seating position by the spring 180 and is also acted upon by the build up of air pressure, if any, in conduit 140. If a drop in air pressure in conduit 140 occurs, for example, due to release of loading on the grinding wheel 122, it allows the piston 178 to be forced leftwards, as viewed in FIG. 8, against the biasing force of the spring 180, the piston 178 being movable sufficiently at times to cover the top end of the stem passage, shown at 183, blocking the supply of compressed air from the source to the conduit 140. By suitably adjusting the amount of biasing force exerted by spring 180, for example, by adjusting the position of the plug end 181, the desired metering action can be obtained.

The air flow regulating assembly 176 restricts and meters the compressed air flowing to the main assembly and helps the assembly to provide a regular and smooth oscillating action regardless of the type of loading applied to the grind stone 122.

Rigidly secured to the fixed member 170 and extending perpendicularly thereto is a plate element 184 and being rigidly supported at its opposite ends by a fixed plate-like portion 185 which is parallel to the member 170, as shown in FIG. 6. The members 185 and 170 are spaced apart sufficiently to allow for the full reciprocation of the grind stone 122 when the assembly is adjusted for maximum excursion by means of hand wheel 165. Mounted on the plate member 184 is a block 186, and threadedly engaged through block 186 and extending through member 184 is a sleeve member 187 having external threads 188. A lock nut 189 is engaged on the threads 188 and locks sleeve 187 in adjusted position on block 186. Threadedly engaged axially in the sleeve 187 is fine adjusting screw 190 in the bottom end of which is mounted a wheel-dressing diamond bit element 191. The parts may be adjusted in a manner presently to be described so that the surface of the periphery of the grind stone 122 can be dressed by the diamond bit element 191 during the reciprocation of the grind stone while it is in operation.

Coarse adjustments of the position of the diamond bit element 191 may be provided by adjusting the sleeve 187 relative to the block 189. Fine adjustments may be made by adjusting the screw 190 relative to the sleeve 187. Adjustment of screw 190 with respect to sleeve 187 may be locked by the provision of a lock nut 192 having a narrow flange 193, the lock nut 192 being lockingly engageable with the top end of the sleeve 187, as shown in FIG. 6. The top end of the sleeve 187 is provided with diametrically opposed flats 194 receivable between the jaws of a conventional open-end wench, whereby to facilitate the adjustments of the sleeve member 187 relative to the fixed block 186.

It will be noted that the central screw 190 is threadedly engaged in internal threads provided only at the lower portion of the interior bore of the external sleeve 187. The friction nut 192 is generally frusto-conical in shape and engages in a correspondingly shaped seat provided in the top rim of sleeve 187, whereby the frusto-conical portion of nut 192 is substantially locked by friction to the sleeve 187. The central screw 190 is rotatable relative to the lock nut 192, which acts as a thread slack adjuster relative to the sleeve member 187.

An indexing means is provided for accurately setting the fine adjustment screw 190. Thus, an indexing disc member 195 is rigidly secured to the top end portion of screw 190, said disc member being provided with evenly spaced indexing apertures 196 concentric with the disc member 195. Thus, in a typical form of the invention, 32 apertures 196 are provided, the apertures being spaced 10° apart. The screw 55, in said typical embodiment, has a 20 thread per inch configuration, whereby the distance between two successive apertures 196, namely 10° movement, is equivalent to an axial movement of 0.0008 inch of screw 190. Rotatably engaged on the top portion of screw 190 immediately above disc 195 is an arm 197 provided with a depending pin 198 located to selectively engage in the apertures 196. A retaining nut 200 is engaged on the top end of screw 190 and a rubber washer 199 is disposed between nut 200 and arm 197 surrounding the screw 190, biasing the arm 197 to a substantially horizontal position wherein the pin 198 is resiliently held in a selected indexing aperture 196. An upstanding stop rod 201 is provided at one corner of the block 186, the stop rod 201 being engageable by the arm 197 and thereby serving as a positive reference means for determining the last adjusted position of arm 197 relative to disc 195. Thus, to change the adjusted position of screw 190 in sleeve 187, the arm 197 is elevated to disengage pin 198 from one opening 196, after which the arm 197 may be rotated relative to the disc 195 to allow the pin 198 to engage in another selected opening 196. The arm 197 may then be rotated to bring it into abutment with the stop rod 201. This provides a definite amount of angular adjustment of screw 190 with respect to sleeve 187, and accordingly, a corresponding definite amount of adjustment of the position of the diamond dressing element 191.

As above mentioned, major adjustments of the position of the element 191 are accomplished by rotating the sleeve 187 by means of a wench engaged with the flats 194. Thus, such adjustment may be necessary after approximately 1 inch of wear takes place on the grind stone 122, in order to provide a sufficiently rigid support for the exposed inner end portion of the screw 190. Since the sleeve 187 may be advanced to provide adequate rigidity of support of the inner end portion of the screw 190, vibration of the inner end portion of the screw is minimized and the risk of dislodging the diamond tip 191 from its socket is considerably reduced, thus contributing to prolongation of the useful life of the diamond dressing tool element 191.

As above mentioned, the spacing between the openings 196 represents a definite degree of advancement of the tool element 191, enabling the operator to determine how much is being removed from the periphery of the grind stone 122, since this can be readily calculated by counting the number of spaces of advancement of pin 198 around the disc 195. As above mentioned, in the typical embodiment above described, each space between a set of adjacent holes 196 represents 0.0008 inch of advancement of the tool 191.

As mentioned, compressed air enters the conduit 140 through the flow regulator 176, the air entering under varying pressure, for example, from 5 to 60 pounds per square inch as determined by the action of the flow regulator 176. The compressed air passes through bushing 138 and conduit 116 and flows through the passage 150. The compressed air flows around the core portion of the spool valve element 109 and passes through passage 151, passage 153 and port 135, and enters the space between the rim of end wall 114 and the annular piston element 119, causing the assembly carried by body 103 to be moved rightwards to the position thereof shown in FIG. 8. As this occurs, air is exhausted from the space between piston element 119 and shoulder 174 through port 134, passage 154, passage 152, the right end portion of bore 148, space 123 which serves as a "hesitation" chamber, passage 131, the flexible spiral conduit 118 and exhaust port 137.

While this exhaustion of air is being completed there is leakage through the clearance space at the left end portion of valve element 109, and this leakage air is allowed to accummulate in the space 124, which is at this time sealed by the engagement of the sealing washer 127 over the port 163. After the pressure in chamber 124 rises sufficiently to overcome the centrifugal force friction of valve element 109, said valve element 109 is moved rightwards to cause the enlarged left end head portion of the valve element 109 to become aligned with and substantially seal the passage 151. However, the leakage of air causes the pressure to rise sufficiently in space 124 to move the spool-valve element 109 to its extreme limit of rightward travel, namely, into abutment with the right-hand stop washer 133. This places passage 150 in communication with passage 152, passage 154 and port 134 and causes compressed air to be introduced into the space between piston element 119 and shoulder 174. This moves the assembly carried by body 103 leftwards to its left limiting position wherein washer 130 is in abutment with the annular stop element 162 and the sealing washer 129 is in sealing engagement with wall member 117. The degree of leftward excursion is of course determined by the setting of the sprocket wheel 161.

This action seals off exhaust port 137 and thereby seals off the right "hesitation" chamber 123, while unsealing the left "hesitation" chamber 124 by the disengagement of the resilient deformable sealing washer 127 from the left end wall member 114. The build up of pressure in chamber 123 then causes the spool element 109 to shift leftwards eventually into engagement with the left stop washer 133, thereby moving the assembly carried by the body 103 to the right because of the entry of the compressed air into the space between piston element 119 and end wall 114 as above described to the limit of rightward excursion permitted by the compression of member 128 and 127 between end walls 117 and 114. The above described cycle is repeated providing reciprocation of the grinding wheel 122 while it is being rotated by the spindle 114.

The scavenger conduit 164 allows the accummulated oil from chamber 124 to be withdrawn, for example where such oil accummulates as a result of the compressed air mistakenly being left on when the machine is not in use.

Hand wheel 165 can be turned while the machine is in operation, causing the sprocket wheel 161 to be adjusted either to the right or to the left, as desired, to either reduce or extend the reciprocation stroke of the apparatus. The employment of the coupling chain 172, which is of substantial length, allows the hand wheel 165 to be located in a relative safe position so that it can be easily manipulated while the crank shaft or the other object being ground is revolving, since the grinding assembly is behind such crank shaft or other object, with the crank shaft located between the reciprocating and rotating grind stone 122 and the operator. Thus, the hand wheel 165 may be located in an elevated and forwardly advanced position making it easily accessible to the operator.

The guide rollers 104 and 104' keep the body 103 from rotating relative to the spindle extension 101, as above mentioned. The bushing 120 is eccentric and is provided with a screw driver slot 205 enabling it to be rotationally adjusted. The rollers 104 and 104' engage in the slots 105, 105 with rolling contact, and the rollers 104, 104' revolve when a load is applied to the grind stone 122.

The provision of the threads on the member 168 which supports the sprocket driving sleeve 166 allows the sprocket wheel 171 to be maintained in alignment with the cooperating sprocket wheel 161. As above mentioned, the sleeve 166 is further supported on the shaft extension element 173, the upper sprocket 171 in FIG. 6 being slidable as well as rotatable on the shaft extension 173.

It will be understood that the speed of reversal of the direction of movement of the body 103 and the parts carried thereby depends to a considerable extent on the amount of clearance provided between the enlarged end portions of the spool-shaped valve element 109 and the internal surface of bore 148. This clearance space is sufficient to allow a sufficient dwell at the opposite ends of the path of excursion of the grind stone 122 to ensure that the corners of the recess being machined will be properly ground before the grind stone 122 moves away.

It will be understood that the conduit 116 and the flanged bushing member 138 secured thereto rotate relative to the stationary sleeve member 155, providing a substantially fluid-tight rotating joint therebetween. Thus, in operation of the machine, the sleeve member 155 is stationary, being fixed to the stationary supply conduit 140, whereas the tube 116 and bushing 138 rotate with the spindle 141.

It will be further understood that although the annular rib element 119 has been mentioned above as a "piston" element, the shoulder 174 defined by the enlarged righthand portion of the spindle extension 101 likewise forms part of a "piston" element with respect to the external cylinder body 103 because of the relatively reciprocatory action taking place between the spindle extension 101 and said body 103. The same is true with respect to the annular rim portion of the end wall member 114 which has sliding, substantially sealing contact with the inside surface of body 103 and which substantially performs a piston function inside body 103.

While certain specific embodiments of an improved reciprocating guiding hub assembly for a grinding wheel have been disclosed in the foregoing description, it will be understood that various modifications within the spirit of the invention may occur to those skilled in the art. Therefore it is intended that no limitation be placed on the invention except as defined by the scope of the appended claims.

I claim:
1. In a grinding machine, a work support, a power-driven grinding wheel spindle mounted adjacent said work support, housing means slidably-mounted on said spindle, means drivingly-interconnecting said housing means and said spindle, the grinding wheel being concentrically-secured on said housing means in a position to abrade a workpiece mounted on said work support, and means to reciprocate the housing means on said spindle.

2. The grinding machine of claim 1, and wherein said spindle is provided with an annular piston element and said housing means comprises a pneumatic cylinder slidably and sealingly-receiving said piston element.

3. The grinding machine of claim 2, and wherein the means drivingly-interconnecting said housing means and said spindle comprises a key element secured in said cylinder, said piston element being formed with a longitudinal recess portion slidably-receiving said key element.

4. The grinding machine of claim 3, and wherein said key element comprises a rod-like pin and said recess portion comprises a longitudinal bore in the piston element.

5. The grinding machine of claim 3, and spaced outwardly-projecting stop elements on the spindle on opposite sides of said cylinder limiting endwise movement of the cylinder.

6. The grinding machine of claim 5, and means to longitudinally adjust the position of one of said stop elements.

7. The grinding machine of claim 6, and wherein the spindle is hollow and has an end wall adjacent the adjustable stop element, an externally-threaded fixed outwardly-projecting conduit rotatably-secured to said end wall, adjusting nut means threaded on said conduit, and thrust-transmitting means on the conduit between said nut means and the adjustable stop element.

8. The grinding machine of claim 7, and wherein the means to reciprocate the housing means comprises a pneumatic supply line connected to the conduit for supplying air pressure to the hollow spindle, the wall of the spindle being formed with a pair of passages at its intermediate portion spaced to receive the piston element therebetween so as to at times admit air pressure into the cylinder spaces at opposite sides of the piston element, and means to at times vent one of said cylinder spaces and seal up the other cylinder space, to develop axial thrust on the cylinder relative to the piston element.

9. The grinding machine of claim 8, and wherein the cylinder is formed at the opposite end portions thereof with respective vent passages and the venting means comprises valve means alternately movable into sealing relationship with the vent passages, and means to alternately actuate said valve means responsive to the movement of the cylinder adjacent the respective stop elements.

10. The grinding machine of claim 9, and wherein the valve means comprises open-ended longitudinal sleeve means mounted in the cylinder with its opposite ends sealingly-engageable with the respective stop elements, a valve pin slidably-disposed in the sleeve means, stop means in the end portions of the sleeve means limiting movement of the valve pin to opposite extreme positions spaced from the ends of the sleeve means, means to seal the respective end passages when the valve pin is in the adjacent end portion of the sleeve means, and means providing sufficient build-up of air pressure in the end portions of the sleeve means when in engagement with the stop elements to reverse the position of the valve pin in the sleeve means.

11. The grinding machine of claim 3, and wherein said key element comprises an inwardly-extending element carried by said cylinder and said recess portion comprises a longitudinal groove formed in said piston element and receiving said inwardly-extending element.

12. The grinding machine of claim 11, and wherein said inwardly-extending element comprises a roller journaled to said cylinder.

13. The grinding machine of claim 3, and spaced stop members located on opposite sides of a portion of said cylinder limiting endwise movement of the cylinder.

14. The grinding machine of claim 13, and wherein said cylinder portion comprises an end wall of the cylinder and one of said stop members comprises an end wall of the spindle.

15. The grinding machine of claim 14, and wherein the other of said stop members comprises an abutment member threadedly-engaged on a fixed supporting element, said fixed supporting element extending in the longitudinal direction of said cylinder.

16. The grinding machine of claim 15, and wherein said fixed supporting element comprises an externally-threaded fixed sleeve mounted axially relative to the cylinder.

17. The grinding machine of claim 3, and wherein the spindle is hollow and has a transverse outer end wall provided with a projecting rim in sealing sliding contact with the inside surface of the cylinder, said cylinder having a transverse end wall adjacent said spindle end wall, an intermediate partition wall in the spindle defining fluid accumulation spaces on opposite sides thereof, said cylinder having an inwardly-projecting annular piston element sealingly and slidably-engaging said spindle and defining working spaces on opposite sides thereof, one of said working spaces being defined between said cylinder piston element and said spindle piston element and the other working space being defined between said cylinder piston element and the rim of the spindle end wall, and wherein the means to reciprocate said housing means on the spindle comprises means to alternately admit pressure fluid into one of said working spaces while allowing fluid to exhaust from the opposite working space through one of the fluid accumulation spaces.

18. The grinding machine of claim 17, and wherein the means to reciprocate said housing means comprises axial pressure fluid supply conduit means connected centrally to said intermediate partition wall, and fluid-passage means communicatively-connecting said supply conduit means to said working spaces through said reversing valve means.

19. The grinding machine of claim 18, and wherein said partition wall is formed with a bore whose opposite ends open into said fluid accumulation spaces and said reversing valve means comprises a spool-shaped valve element having enlarged annular end portions slidably-mounted in said bore with clearance between the enlarged end portions and the bore to allow leakage, said fluid-passage means including a passage formed in said partition wall connecting said supply conduit means to the intermediate portion of the bore and to the intermediate portion of the valve element, and respective passages formed in the outer portions of the partition wall and the spindle wall connecting the end portions of the bore to the opposite end portions of said working spaces, the valve element being movable in the bore responsive to build-up of fluid pressure in said accumulation spaces caused by leakage between the enlarged end portions of the valve element and the bore.

20. The grinding machine of claim 19, and wherein said supply conduit means comprises a stationary conduit, a sleeve connected to said conduit and arranged axially relative to said cylinder, and a tube rotatably and sealingly-engaged in said sleeve and connected to the central portion of said partition wall.

21. The grinding machine of claim 20, and an adjustable stop member threadedly-engaged on said sleeve, and means to alternately vent said working spaces to atmosphere through said fluid accumulation spaces responsive to the reciprocatory movement of said cylinder transverse end wall between said stop member and said spindle transverse end wall.

22. The grinding machine of claim 21, and wherein said stop member comprises a sprocket wheel, an adjusting means for said sprocket wheel comprising threaded shaft means spaced from and parallel to said sleeve, a second sprocket wheel threadedly-engaged on said last-named shaft means, and a sprocket chain drivingly-coupling said sprocket wheels.

23. The grinding machine of claim 18, and wherein said pressure fluid supply conduit means includes a fluid pressure supply conduit and means to regulate the flow of pressure fluid through said supply conduit in accordance with the pressure in said supply conduit.

24. The grinding machine of claim 1, and a fixed tool-support body mounted outwardly-adjacent and extending parallel to the path of movement of the periphery of said grinding wheel, dressing tool-holding means threadedly-engaged with said body and extending perpendicular thereto, and a grinding wheel-dressing bit mounted in the inner end of the tool-holding means.

25. The grinding machine of claim 24, and wherein said tool-holding means comprises an outer sleeve member threadedly-engaged with said body and an inner tool-holding screw member threadedly-engaged in said outer sleeve member.

26. The grinding machine of claim 25, and an indexing disc secured to the outer end portion of said tool-holding screw member, said disc being formed with concentrically-arranged indexing apertures, an arm rotatably and resiliently-connected to said tool-holding screw member and having a pin element selectively-engageable in said apertures, and a upstanding stop rod on said body extending adjacent the periphery of said disc and being engageable by said arm.

References Cited
UNITED STATES PATENTS

| | | | |
|---|---|---|---|
| 2,813,378 | 11/1957 | Hill | 51—50 |
| 2,661,580 | 12/1953 | Crompton | 51—34.8 |
| 2,952,949 | 9/1960 | Walker | 51—50 |

WILLIAM R. ARMSTRONG, Primary Examiner

U.S. Cl. X.R.

51—50, 168